(12) United States Patent
Dutra E Mello et al.

(10) Patent No.: US 8,448,926 B2
(45) Date of Patent: May 28, 2013

(54) LIQUID DISTRIBUTOR FOR A ROTATING PACKED BED

(75) Inventors: Marcus Dutra E Mello, Moraga, CA (US); Manuel Lim, Walnut Creek, CA (US); Krishniah Parimi, Alamo, CA (US); David Brossard, Alameda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 222 days.

(21) Appl. No.: 12/797,568

(22) Filed: Jun. 9, 2010

(65) Prior Publication Data

US 2011/0303088 A1 Dec. 15, 2011

(51) Int. Cl.
*B01D 47/16* (2006.01)

(52) U.S. Cl.
USPC ............... 261/83; 261/118; 95/149; 95/260; 96/291; 96/297; 422/168; 422/177

(58) Field of Classification Search
USPC ...... 95/151, 149, 232, 235, 236, 260; 261/83, 261/89, 118; 96/291, 296, 297; 422/168, 422/177
See application file for complete search history.

(56) References Cited

U.S. PATENT DOCUMENTS

| | | | | |
|---|---|---|---|---|
| 3,809,375 A | * | 5/1974 | Bonnet | 261/87 |
| 4,283,255 A | | 8/1981 | Ramshaw et al. | |
| 4,382,045 A | * | 5/1983 | Wem | 261/89 |
| 4,382,900 A | | 5/1983 | Wem | |
| 4,400,275 A | * | 8/1983 | Ramshaw et al. | 210/321.68 |
| 7,429,288 B2 | | 9/2008 | Gardner et al. | |
| 7,649,024 B2 | | 1/2010 | Li et al. | |
| 2004/0015003 A1 | | 1/2004 | Yang et al. | |
| 2006/0090647 A1 | | 5/2006 | Lin et al. | |
| 2007/0295662 A1 | | 12/2007 | Park et al. | |
| 2008/0267843 A1 | | 10/2008 | Burns et al. | |

OTHER PUBLICATIONS

Chandra et al "Characteristics of Flow in a Rotating Packed Bed (HIGEE) with Split Packing", Ind. Eng. Chem. Res. 2005, 44, 4051-4060.*
Chandra, A., et al., "Characteristics of Flow in a Rotating Packed Bed (HIGEE) with Split Packing" *Ind. Eng. Chem. Res.* 44:4051-4060 (2005).
Liu, H.S. et al. Characteristics of a flow in a rotating packed bed. Ind. Eng. Chem.

* cited by examiner

*Primary Examiner* — Robert A Hopkins
(74) *Attorney, Agent, or Firm* — Richard J. Schulte

(57) ABSTRACT

Provided is a method for contacting a gas with a liquid in a rotating packed bed. The method comprises providing a rotating packed bed comprising two sets of rotatable packing rings disposed within a chamber and defining an interior region. The rotating packed bed also comprises at least one liquid distributor with an inlet for accepting a liquid, the inlet in communication with an exit port for infusing the liquid into the interior region. The liquid distributor also comprises at least one gas outlet for accepting gas which has passed through the packed bed and for removing the gas from the interior region. The two sets of rotatable packing rings are caused to rotate. Liquid is infused into the interior region by way of the liquid inlet, and gas is injected through at least one gas inlet into the interior region, with the liquid and gas passing through each of the packing rings in countercurrent flow. Liquid is removed from the interior region through a liquid outlet, and gas is removed through the gas outlet in the liquid distributor.

19 Claims, 3 Drawing Sheets

LIQUID DISTRIBUTOR FOR A ROTATING PACKED BED

BACKGROUND

The present invention relates to a liquid distributor and its use in connection with a rotating packed bed (RPB) for liquid/gas contact. In particular, a liquid distributor is provided which permits superior mass transfer.

High gravity reactors are known for effecting a mixing of a gas and liquid and a mass transfer between the two. High gravity field reactors typically comprise a liquid or gas inlet, a gas or liquid outlet, and an inner chamber. The inner chamber may be packed with media, such as porous fillers, which are known to the skilled persons in the field. The media may be formed of, for example, foam metal or non-metal material, metal or non-metal wire mesh, porous materials such as metal balls, glass balls, ceramic members, metal oxide, or the like.

One particular example of a high gravity field reactor is a rotating packed bed (RPB) or Higee reactor. The terms "Higee" and "RPB reactor" are generally interchangeable and refer to devices capable of generating a high gravity field to affect mass transfer between at least two liquids and/or gases. The high gravity field is the result of a centrifugal force field generated by rotation of packed beds in the RPB or Higee reactors. The phrase "high gravity field" means that liquid and/or gas reactants are introduced into the high gravity field and interact while they are moved centrifugally, or the liquid reactant is moved from the center of the RPB or Higee reactor centrifugally and the gas reactant is introduced oppositely with respect to the liquid reactant along the radial direction when the packed bed is rotating. In general, the reaction represented by the phrase "under high gravity" can be carried out in any RPB or Higee reactor or any other similar high gravity field reactor.

One specific example of a mass transfer mixing device is the high gravity field reactor disclosed in US 2007/0295662 A1. The centrifugal movement used to obtain the high gravity field can be conducted in a horizontal direction, a vertical direction, or any other arbitrary direction.

Another rotation packed bed is described in Chandra et al, "Characteristics of Flow in a Rotating Packed Bed (HIGEE) with Split Packing", Ind. Eng. Chem. Res., 2005, 44, pp. 4051-4060. In the rotating packed bed, the packing is split into annular rings to rotate adjacent rings in the counter direction. A specific liquid distributor is employed with regard to the split packing to permit good gas removal as well as liquid distribution. However, some sacrifice is realized in the mass transfer.

Improvements with regard to the mass transfer effected in rotating packed beds would render such reactors/contactors even more attractive to the industry. The search continues for improved mass transfer devices to allow more efficient contacting between gases and liquids.

SUMMARY OF THE INVENTION

Provided is a method for contacting a gas with a liquid in a rotating packed bed. The method comprises providing a rotating packed bed comprising two sets of rotatable packing rings disposed within a chamber and defining an interior region. The rotating packed bed also comprises at least one liquid distributor with an inlet for accepting a liquid, the inlet in communication with an exit port for infusing the liquid into the interior region. The liquid distributor also comprises at least one gas outlet for accepting gas which has passed through the packed bed and for removing the gas from the interior region. The two sets of rotatable packing rings are caused to rotate. Liquid is infused into the interior region by way of the liquid inlet, and gas is injected through at least one gas inlet into the interior region, with the liquid and gas passing through each of the packing rings in countercurrent flow. Liquid is removed from the interior region through a liquid outlet, and gas is removed through the gas outlet in the liquid distributor.

In one embodiment, there is provided a liquid distributor for use in a rotating packed bed. The liquid distributor comprises at least one liquid inlet and at least one gas outlet. The liquid inlet is connected to a conduit for delivering a liquid to the inlet, with the liquid inlet in communication with an outlet that delivers a spray of fine droplets as the liquid exits the distributor. The at least one gas outlet is connected to a conduit for removing gas from the rotating packed bed.

DETAILED DESCRIPTION

Figure 1:
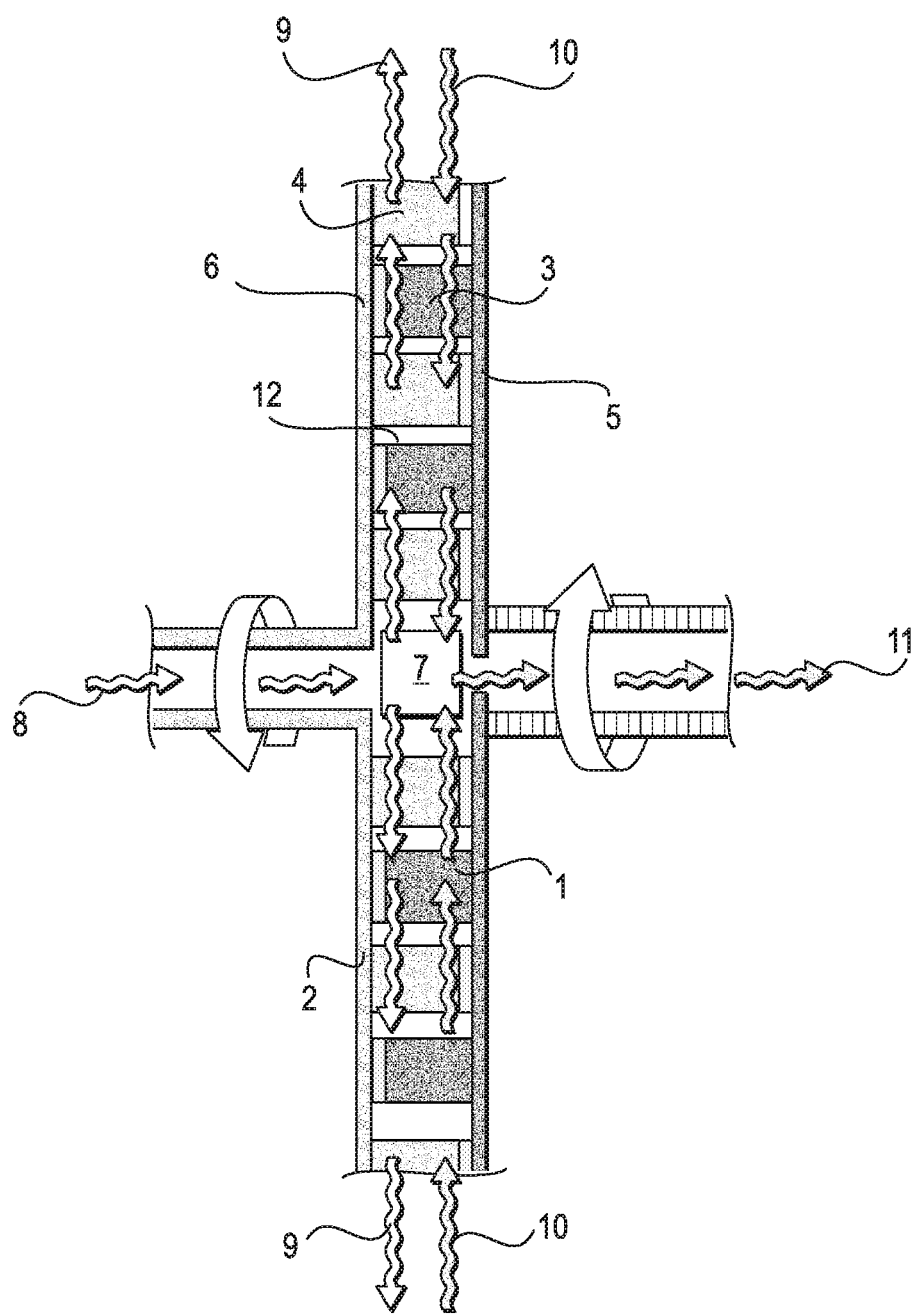
FIG. 1 depicts a rotating packed bed which utilizes a liquid distributor in accordance with one embodiment.

Provided is a liquid distributor for use in a rotating packed bed. The liquid distributor design allows for the use of all the packing rings, thereby fully utilizing them for contact between gas and liquid phases. This results in superior mass transfer.

The liquid distributor comprises at least one liquid inlet connected to a conduit for delivering a liquid to the inlet. The liquid can be any suitable liquid for use in contacting a gas and is generally aqueous. The liquid inlet in the distributor is in communication, i.e., connected, with an outlet port that delivers a spray of fine droplets as the liquid exits the distributor. Generally, once the liquid exits the distributor, the liquid is contacted with the packing rings of a rotating packed bed. The outlet port delivers a spray of fine droplets by comprising a number of small orifices to thereby create highly dispersed thin liquid jets that are directed into the packing bed to counter-contact a gas phase.

The liquid distributor also comprises at least one gas outlet. The gas can be any suitable gas, and can include, for example, $O_2$, $CO_2$, $CO$, $N_2$, $H_2S$, $H_2$ and $CH_4$, or mixtures thereof. The gas outlet accepts the gas, and is transported by way of a connection to a conduit for removing the gas from the rotating packed bed. The gas outlet, or gas withdrawal port, is in the liquid distributor so that all of the rings are used for contact between the gas and liquid phases. The gas outlet allows the gas to pass through the liquid distributor through different orifices than the liquid. Thus, the gas flow enters and passes through the liquid distributor without contacting the liquid inside the liquid distributor assembly.

As a result, the liquid distributor permits superior mass transfer as all packing rings are used to effect gas/liquid contact. This would result, for example, in superior removal or separation of one gas from another when using a liquid absorbent. Smaller equipment could therefore be used to achieve equivalent performance of separation, e.g., of $CO_2$ gas, as compared to the prior art because the packing is fully utilized. As well, since the same orifices or openings are not used for both the gas and liquid to pass through, the orifices are not subject to clogging as they might be if both the gas and liquid were forced through the same openings.

Generally, the liquid distributor will have more than one liquid inlet and more than one gas outlet. In one embodiment, the liquid distributor has eight gas outlets and four liquid inlets. The gas outlets can also be ultimately connected or in communication with a vent to the atmosphere, or a facility for using the gas.

With the liquid distributor, a method for contacting a gas with a liquid in a rotating packed bed can be practised. The method would comprise providing a rotating packed bed, generally comprising two sets of rotatable packing rings. One set of packing rings can be on one rotor, and the second set on a second rotor. The packing rings are therefore split and rotate in co-current direction or in countercurrent direction. The packing rings can be formed of, for example, foam metal or non-metal material, metal or non-metal wire mesh, porous materials such as glass or ceramic members, metal oxides, and the like. In one embodiment, the packing rings are comprised of a metal foam material.

The packing rings can rotate at any suitable speed. Generally, the packing rings are rotated at a speed of about 50 to 2500 RPM, or at a tangential velocity of about 4 m/s to 25 m/s.

The rotating packed bed is disposed within a chamber defining an interior region. The packed bed further comprises a liquid distributor as described above. The liquid distributor comprising at least one inlet for accepting a liquid, the inlet being in communication with an exit port for infusing the liquid into the interior region. In one embodiment, the liquid infused into the liquid inlet is dispersed through the exit port as a spray of fine droplets. The liquid distributor also comprises at least one gas outlet for accepting gas which has passed through the packed bed. The gas outlet is in communication with a conduit to remove the gas from the interior region.

In practicing the method, the two sets of rotatable packing rings are rotated. Liquid is infused by way of the at least one liquid inlet into the interior region. Gas is injected through a gas inlet into the interior region, with the liquid and gas then passing through each of the packing rings in countercurrent flow. Liquid is removed from the interior region through a liquid outlet, and the gas is removed from the packed rotating bed and interior region through a gas outlet in the liquid distributor.

In one embodiment, there is provided a reactor for contacting a gas with a liquid in a rotating packed bed using the present liquid distributor. The reactor comprises two sets of rotatable packing rings disposed within a chamber defining an interior region. The packing rings can rotate in co-current direction, and can comprise any suitable packing material, e.g., a metal foam material. The reactor also comprises a liquid distributor with at least one inlet for infusing a liquid into the interior region, and at least one outlet for removing gas from the rotating packed bed and interior region. The reactor also comprises at least one liquid outlet for removing liquid from the interior region, and at least one gas inlet for injecting gas into the interior region.

Generally, the liquid distributor used has more than one liquid inlet and each inlet is in communication with an outlet port that delivers a spray of droplets as the liquid exits the distributor and enters the interior region with the packing The liquid distributor also generally has more than one outlet for accepting gas and removing it from the reactor.

Turning now to the Figures of the Drawing, FIG. 1 depicts a rotating packed bed with packing rings 1 and 2. Two sets of metal foam rings 3 and 4 are used as the packing rings, which are split and attached to a right rotor 5 and left rotor 6. The set of rings 3 on the right rotor 5 comprises two rings, and the set of rings 4 on the left rotor 6 has three rings. The number of rings in a set can vary, however, depending on the number desired for a particular process. A liquid distributor 7 is in the middle of the rotors, through which liquid enters and is dispersed to the packing rings, and gas is collected and withdrawn after passing through the packing rings in countercurrent fashion to the liquid. Liquid enters at 8, passes through the liquid distributor 7 and leaves the packing rings at 9. Gas enters the packing at 10, enters the liquid distributor 7, passes therethrough and leaves the bed (and interior region) at 11. Gaps 12 exist between the rings. To minimize gas by-pass through these gaps between the rings and rotors, recesses (not shown) are created in the rotor surface so that the rings would create a path of higher resistance to the flow against the recesses.

Figure 2:
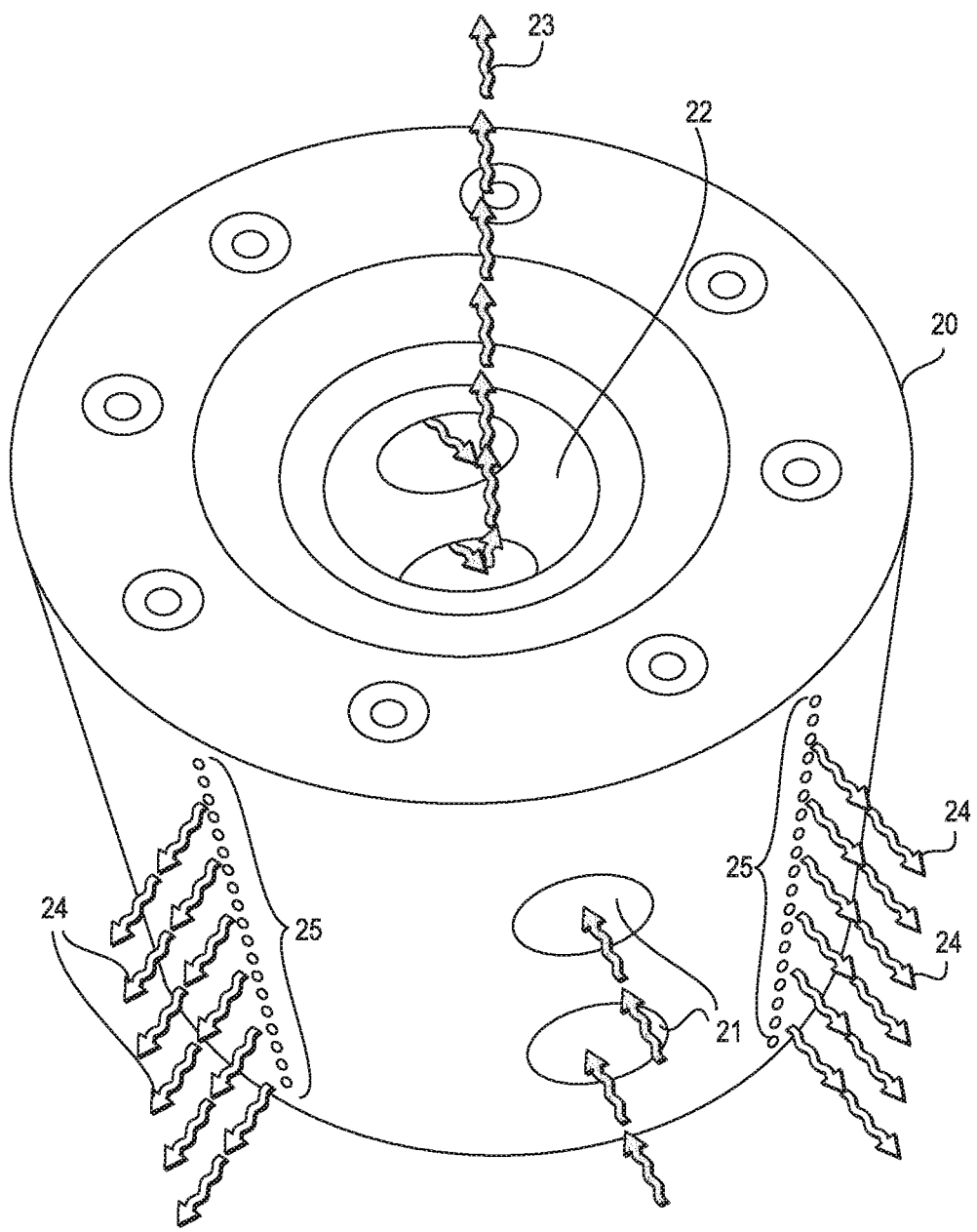
FIG. 2 depicts a liquid distributor in accordance with one embodiment, with the gas flow illustrated.

In FIG. 2, a liquid distributor 20 is shown with the gas flow schematically shown. Gas that has passed through the packing is accepted in the gas outlet orifices 21. In one embodiment, there are eight 1-inch orifices as the gas outlet orifices. The gas then converges into a center conduit 22 that will evacuate the gas 23 from the packed bed and interior region. Liquid that is dispersed from the liquid distributor comes out at 24 from a number of small orifices 25.

Figure 3:
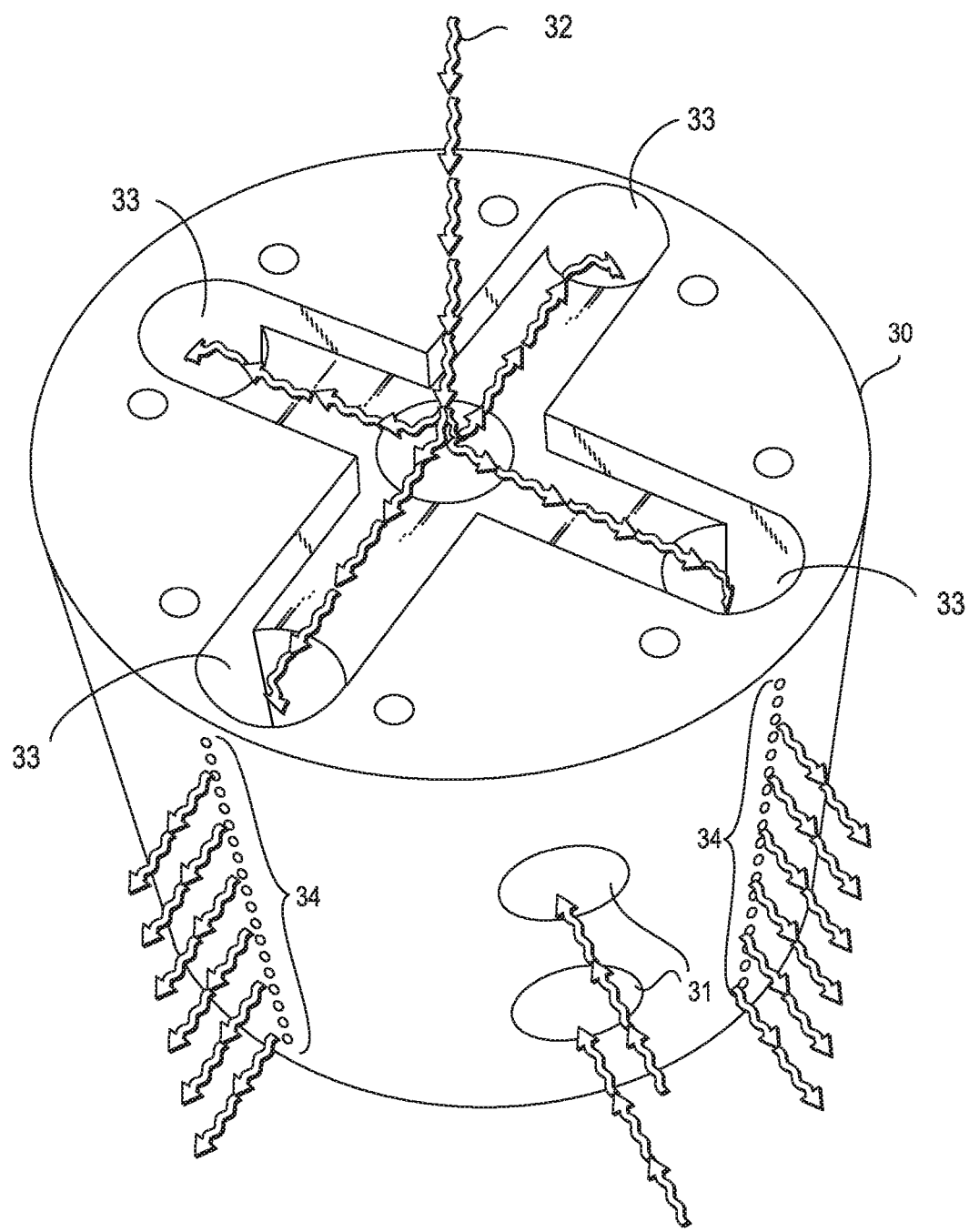
FIG. 3 depicts a liquid distributor in accordance with one embodiment, with the liquid flow illustrated.

FIG. 3 depicts a liquid distributor 30 and the liquid flow through the distributor. Gas enters through orifices 31. The liquid 32 that is entering the assembly will penetrate the liquid distributor and be distributed through four liquid inlets 33. For example, the four inlets can be four 0.984 inch diameter inlets. Each inlet is directly connected to a number of small orifices, for example, nineteen small orifices 34, each 0.058 inch in diameter, to create highly dispersed thin liquid jets that are directed into the packing bed to counter-contact the gas. The liquid distributor will rotate at the speed of the rotors.

The process and reactor employing the present liquid distributor can be used in any gas/liquid contacting application effectively and efficiently. For example, the process and reactor can be used in removing gases from a mixture of gases, effecting a reaction, or degassing a liquid. Superior mass transfer is achieved in employing the present liquid distributor in such processes.

From the above description, those skilled in the art will perceive improvements, changes and modifications, which are intended to be covered by the appended claims.

What is claimed is:
1. A method for contacting a gas with a liquid in a rotating packed bed, which comprises
   providing a rotating packed bed comprising two sets of rotatable packing rings disposed within a chamber and defining an interior region, and a liquid distributor with at least one net for accepting a liquid, the inlet in communication with an exit port for infusing the liquid into the interior region, and at least one gas outlet in the liquid distributor for accepting gas which has passed through the packed bed and removing the gas from the interior region,
   causing two sets of rotatable packing rings to rotate;
   infusing liquid by way of the at least one liquid net into the interior region and injecting gas through at least one gas net into the interior region, with the liquid and gas passing through each of the packing rings in countercurrent flow;
   removing liquid from the interior region through a liquid outlet; and
   removing gas through the gas outlet in the liquid distributor.

2. The method of claim 1, wherein the two sets of packing rings rotate in co-current direction.

3. The method of dam 1, wherein the two sets of packing rings rotate in countercurrent direction.

4. The method of claim 1, wherein the rotatable packing rings are comprised of metal foam packing rings.

5. The method of claim 1, wherein the liquid is aqueous.

6. The method of claim 1, wherein the gas is selected from the group consisting of $O_2$, $CO_2$, CO, $N_2$, $H_2S$, $H_2$ and $CH_4$, and mixtures thereof.

7. The method of claim 1, wherein the packing rings rotate at a tangential velocity of about 4 m/s to about 25 m/s.

8. The method of claim 1, wherein the packing rings rotate at a speed of about 500-2500 rpm.

9. The method of claim 1, wherein the liquid infused into the liquid net is dispersed as a spray of fine droplets.

10. A reactor for contacting a gas with a liquid in a rotating packed bed comprising
    two sets of rotatable packing rings disposed within a chamber defining an interior region,
    a liquid distributor with at least one net for infusing a liquid into the interior region and at least one outlet for removing gas from the interior region;
    at least one liquid outlet for removing liquid from the interior region, and at least one gas net for injecting gas into the interior region.

11. The reactor of claim 10, wherein the liquid distributor has more than one liquid inlet and each net inlet is in communication with an outlet port that delivers a spray of droplets as the liquid exits the distributor and enters the interior region; and the liquid distributor has more than one outlet for accepting gas and removing it from the interior region.

12. The reactor of claim 10, wherein the packing rings rotate in a co-current direction.

13. The reactor of dam 10, wherein the packing rings rotate countercurrent to each other.

14. The reactor of claim 10, wherein the packing rings are metal foam packing rings.

15. The reactor of claim 10, wherein the liquid distributor infuses a liquid into the interior region in a spray of fine droplets.

16. A liquid distributor for use in a rotating packed bed, the liquid distributor comprising at least one liquid net connected to a conduit for delivering a liquid to the net and with the liquid net in communication with an outlet that delivers a spray of fine droplets as the liquid exits the distributor, and at least one gas outlet for accepting gas and which is connected to a conduit for removing gas from a rotating packed bed.

17. The liquid distributor of claim 16, wherein the distributor has more than one liquid net and more than one gas outlet.

18. The liquid distributor of claim 16, wherein the distributor has four liquid inlets and eight gas outlets.

19. The liquid distributor of claim 16, wherein the conduit connected to the gas outlet is also connected to a vent to the atmosphere or a process vessel.

\* \* \* \* \*